July 20, 1954 J. G. SPRACKLEN 2,684,403

TELEVISION RECEIVER

Filed Nov. 30, 1951 2 Sheets-Sheet 1

INVENTOR:
JOHN G. SPRACKLEN
BY Francis W. Crotty
HIS ATTORNEY.

July 20, 1954 J. G. SPRACKLEN 2,684,403

TELEVISION RECEIVER

Filed Nov. 30, 1951 2 Sheets-Sheet 2

*INVENTOR:*
JOHN G. SPRACKLEN
*BY* Francis W. Crotty
HIS ATTORNEY.

Patented July 20, 1954 2,684,403

UNITED STATES PATENT OFFICE 2,684,403

TELEVISION RECEIVER

John G. Spracklen, Chicago, Ill., assignor to Zenith Radio Corporation, a corporation of Illinois Application November 30, 1951, Serial No. 259,063

7 Claims. (Cl. 178—7.5)

This invention relates to television receivers and more particularly to synchronizing and automatic gain control systems for use in such receivers.

In the copending applications of Robert Adler, Serial No. 139,401, filed January 19, 1950, now Patent 2,606,300, issued August 5, 1952, for "Electron-Discharge Devices" and Serial No. 139,402, filed January 19, 1950, for "Synchronizing-Control Apparatus," both assigned to the present assignee, there are disclosed and claimed a novel electron-discharge device and system for use as a synchronizing-control system in a television receiver or the like. In the preferred embodiment, a two-section tube is employed, the first section operating as a synchronizing-signal clipper and balanced line-frequency phase-detector to develop between a pair of anodes a balanced unidirectional control voltage indicative of the phase difference between the local line-frequency oscillator and the incoming line-frequency synchronizing-signal pulses. In the other section of the tube, a beam is simultaneously subjected to a sinusoidal magnetic-deflection field energized from the line-frequency sweep output and to a slow lateral displacement in accordance with the balanced unidirectional control voltage developed between the two phase-detector anodes in the other section. In this manner, the duty cycles of the two final anodes in the second section of the tube vary in accordance with the unidirectional control potential developed between the phase-detector anodes in the first section. Either the leading edge or the trailing edge of the developed quasi-square wave is employed to drive the line-frequency sweep system. The output voltages appearing at the phase-detector anodes may be combined and integrated to provide field-frequency output pulses for controlling the field-frequency sweep system, or a separate anode may be provided for this purpose. Thus, a single tube, together with a small number of external circuit elements, performs the several functions of synchronizing-signal separator, automatic-frequency-control phase-detector, line-frequency oscillator, and reactance tube, providing a substantial saving in comparison with conventional systems which usually employ three or more tubes to perform these functions. However, a synchronizing-control tube of this type is of relatively complex construction and requires the use of an external magnetic field energized from the output of the line-frequency sweep system.

In the copending application of Robert Adler, Serial No. 242,509, filed August 18, 1951, for "Television Receiver," and assigned to the present assignee, there are disclosed and claimed a novel tube and system for obtaining both noise-immune synchronizing-signal separation and gated automatic gain control generation. In a preferred form of this system, a sheet-like electron beam of substantially rectangular cross-section is projected through a deflection-control system toward a target electrode which is provided with a pair of apertures and is followed by plate electrodes for collecting space electrons which pass through the respective apertures. Detected composite video signals are applied to the deflection-control system in such a manner that space electrons are permitted to pass through the two apertures in the target electrode only during synchronizing-pulse intervals. Moreover, extraneous noise impulses, which are generally of much greater amplitude than the desired synchronizing pulses, cause transverse deflection of the beam beyond the apertures so that space electron flow to the plate electrodes is again interrupted. One of the plate electrodes is employed to derive noise-immune output pulses corresponding to the synchronizing-pulse components of the applied composite video signals, and these output pulses drive the line-frequency and field-frequency scanning systems. A keying signal, derived from the line-frequency and/or field-frequency scanning system, is applied to the other plate electrode to obtain a gated automatic control potential which is then applied in a conventional manner to one or more of the early receiving stages. In order to insure the establishment of synchronizing-pulse output at the first plate electrode by the time the automatic gain control system goes into effect to limit further growth of the signal, the two apertures in the target electrode are disposed in overlapping alignment in a direction parallel to the plane of the sheet-like electron beam. In addition to providing noise-immune synchronizing-signal separation and automatic gain control generation in a single tube, this system has the important advantage of automatically establishing the correct synchronizing-signal clipping level for all receiver-input signal levels, with the result that incorrect synchronizing-pulse clipping which might otherwise be caused by drift or misadjustment of the automatic gain control circuits is effectively precluded.

While each of these two systems individually permits receiver simplification by virtue of a combination of functions in a single electron-discharge tube, and while each results in improved receiver operation in some respects, the two systems do not readily lend themselves to consolidation in a single multi-purpose tube. The synchronizing-control system described in the first-mentioned Adler application requires magnetic deflection of a beam which has been gated by the incoming synchronizing-pulses to obtain automatic-frequency-control phase-detection. On the other hand, electrostatic deflection is employed in the combined synchronizing-signal separator and automatic gain control generator of the last-mentioned Adler application, and it is not feasible to restrict a magnetic deflection field to that portion of the beam trajectory which follows the apertured target electrode. This consideration alone would prevent facile incorporation of the two systems in a single envelope. Moreover, to obtain the desired phase detection in the synchronizing-control system, the electron beam should originate at a fixed source, while the effective origin of the beam passing through the apertured target electode in the combined synchronizing-signal separator and automatic gain control generator may be anywhere within the synchronizing-pulse clipping aperture. Even if these difficulties were to be overcome, the resulting structure would be complex and not well adapted to economical mass production techniques.

In the copending application of John G. Spracklen, Serial No. 246,768, filed September 15, 1951, for "Television Receiver," and assigned to the present assignee, there are disclosed and claimed a still further novel tube and system for combining the desirable features embodied in the systems of the aforementioned Adler applications. To achieve this objective, the requirement for a magnetic deflection field is obviated by modifying the tube construction and external circuit connections to provide phase detection by means of a gating action. To this end, the single synchronizing-signal output plate of the last mentioned Adler tube is replaced by at least a pair of phase-detector plate electrodes symmetrically positioned behind the sync clipping aperture. A balanced comparison signal is applied between the two phase-detector plates from the line-frequency scanning system of the receiver. When the desired condition of phase synchronism exists, the phase-detector plates are maintained at equal potentials; however, upon deviation from synchronism, a balanced control potential indicative of the magnitude and direction of the deviation is developed. In accordance with a preferred embodiment, this system is employed in conjunction with a deflection tube oscillator, and the phase-detector plate electrodes are direct-coupled to the deflection plates of the oscillator tube to effect automatic frequency control.

While both the last-mentioned Adler system and the arrangement described and claimed in the aforementioned Spracklen application afford numerous advantages in respect of cost reduction and receiver simplification while at the same time providing improved receiver operation, it has been observed that each of these systems may exhibit a tendency toward paralysis under certain extreme operating conditions. During normal operation, the signal level at the input of the video detector is maintained constant by the automatic gain control action, and the beam of the synchronizing-control tube is maintained in a position such that synchronizing output is always obtained. Under unusual conditions, as for example when the receiver is switched from a weak-signal channel to one carrying a strong signal, the beam may be deflected far beyond its normal position; if no provision is made to insure the generation of an automatic gain control potential under such a condition, the receiver scanning circuits may become paralyzed. It is possible, as pointed out in the Adler and Spracklen applications, to insure against such a self-perpetuating paralysis by providing an extension of the AGC aperture so that an automatic gain control potential is necessarily generated even under abnormal overload conditions to restore the system to its normal operating state. However, this expedient is not an ideal solution of the problem for the reason that it necessarily results in at least a partial sacrifice of noise immunity. Moreover, it may be possible under extreme operating conditions with certain circuit arrangements and tube constructions that the beam may be swept even beyond the extension of the AGC aperture so that paralysis of the receiver is again encountered.

It is an important object of the present invention to provide a new and improved automatic gain control system of the type described in the Adler and Spracklen applications but which is not subject to paralysis even under abnormal operating conditions such as may be encountered on switching from a weak-signal channel to one carrying an extremely strong signal.

It is another object of the invention to provide such an improved automatic gain control system in which the necessity for an extension of the automatic gain control slot is obviated, so that the full advantages of noise immunity are achieved.

In accordance with the present invention, a new and improved television receiver comprises an image-reproducing device and a scanning system for controlling the scansion thereof. The receiver also comprises receiving circuits for translating received composite television signals, a video detector for demodulating the translated composite television signals to produce unidirectional composite video signals including video-signal components and synchronizing-signal components of amplitude greater than the maximum amplitude of the video-signal components, means for utilizing the synchronizing-signal components to control the scanning system, and a signal-translating circuit direct-coupled to the video detector for translating the composite video signals under normal operating conditions but subject to paralysis under abnormal operating conditions. A beam deflection tube is provided comprising an electron gun for projecting an electron beam, an electrostatic deflection-control system responsive to an input signal for subjecting the beam to a transverse deflection field, a plate electrode having a predetermined receptive area narrow relative to the full deflection range of the control system, and an anode for collecting electrons not collected by the plate electrode. A voltage-divider network is connected between the signal-translating circuit and the deflection-control system and has a direct voltage-to-alternating voltage transmission ratio less than unity for causing transverse deflection of the beam to a first position intercepting the receptive area of the plate electrode in response to the synchronizing-signal components under normal conditions and to a second position, also intercepting the receptive area of the plate electrode, under abnormal paralysis conditions. An energizing signal is applied to the plate electrode, and an output circuit is coupled to the plate electrode for developing a unidirectional control potential in response to collection of space electrons by the receptive area. The control potential is utilized to effect automatic control of an operating characteristic of the receiver.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Throughout the specification and the appended claims, the term "composite television signal" is employed to describe the received modulated carrier signal, while the term "composite video signal" is used to denote the varying unidirectional signal after detection.

Figures 1, 2, 4:
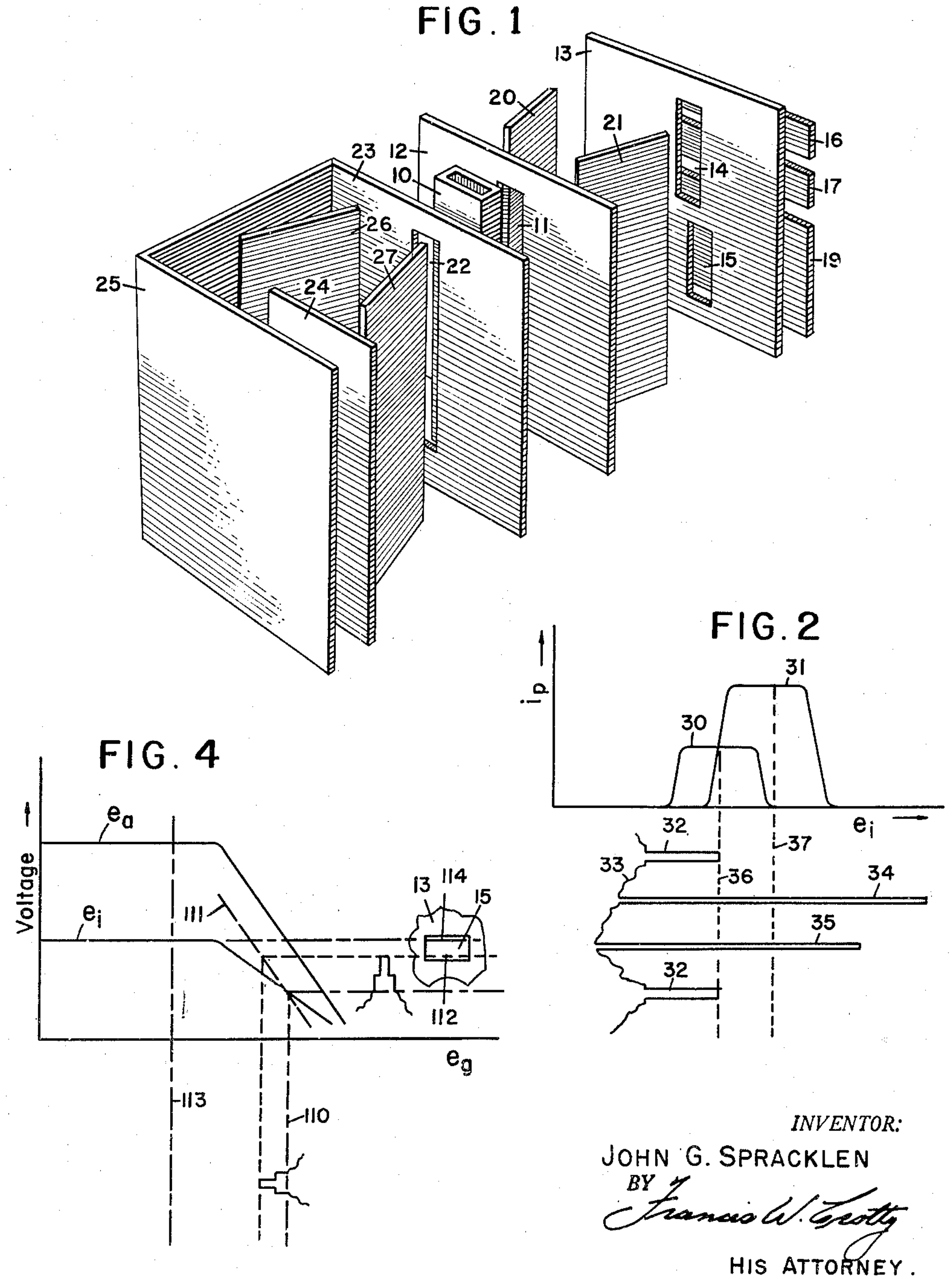
Figure 1 is a perspective view of the electrode system of an electron-discharge device useful in a system embodying the present invention.
Figure 2 is a graphical representation of certain operating characteristics of the tube shown in Figure 1.
Figure 4 is a graphical representation of certain operating characteristics of the receiver of Figure 3.

In the perspective view of Figure 1, which illustrates the essential elements of an electron-discharge device useful in a preferred embodiment of the invention, two separate sheet-like electron beams of substantially rectangular cross-section are projected from opposite electron-emissive surfaces of a common elongated cathode 10 having an indirect heater element (not shown). In the right-hand half of the tube, as viewed in Figure 1, space electrons originating at cathode 10 are projected through a slot 11 in an accelerating electrode 12 toward a target electrode or intercepting anode 13 which is provided with a pair of rectangular apertures or slots 14 and 15 in overlapping alignment in a direction parallel to cathode 10. Two plate electrodes 16 and 17 are provided for collectively receiving space electrons which pass through aperture 14, and an additional plate electrode 19 is provided for receiving space electrons which pass through aperture 15. A deflection-control system, illustrated as a pair of electrosatic-deflection plates 20 and 21, is provided between accelerating electrode 12 and intercepting anode 13. Preferably the tube is so constructed and operated that the width of the beam at the plane of target electrode 13 is less than that of aperture 14.

In the left-hand half of the tube, as viewed in Figure 1, electrons originating at cathode 10 are projected through a slot 22 in an accelerating electrode 23 toward a pair of anodes 24 and 25 respectively having active portions on opposite sides of the undeflected path of this second beam. A pair of electrostatic-deflection plates 26 and 27 are provided between slot 22 and anodes 24 and 25.

In operation, the transverse deflection field established by deflection plates 20 and 21 is adjusted to direct the electron beam in the right-hand section of the tube to an electron-impervious portion of target electrode 13, for example, to a solid portion of electrode 13 on the side of aperture 14 nearer deflection plate 20. When an input signal of positive polarity is applied to deflection plate 21, or alternatively when an input signal of negative polarity is applied to deflection plate 20, the beam is deflected at least partially into apertures 14 and 15 whenever the input signal reaches a predetermined amplitude level. During such intervals, current is permitted to flow in the output circuits associated with plate electrodes 16, 17 and 19, provided these electrodes are maintained at a proper potential to receive electrons, while during other intervals no such current flow can occur. Moreover, when the input signal exceeds a predetermined higher amplitude, the beam is deflected beyond aperture 14 of intercepting anode 13, and current flow to plate electrodes 16 and 17 is again interrupted. At still greater amplitudes, the current flowing to plate electrode 19 is extinguished as the beam sweeps beyond aperture 15. Consequently, if plate electrodes 16 and 17 each have equal receptive areas, the transfer characteristic of the deflection-control system with respect to each of these plate electrodes is substantially that represented by curve 30 of Figure 2, in which the current $i_p$ flowing to plate electrode 16 or 17 is plotted as a function of the input voltage $e_i$ applied to the deflection-control system. The transfer characteristic of the deflection-control system with respect to plate electrode 19 is determined by the geometry of aperture 15 in target electrode 13 and, for the illustrated construction, may be represented by curve 31 of Figure 2.

The left-hand portion of the structure of Figure 1 constitutes a conventional deflection-control electrode system. The electron beam projected through slot 22 of accelerating electrode 23 is directed either to anode 24 or to anode 25 in accordance with the instantaneous potential difference between electrostatic-deflection plates 26 and 27. Thus, if a sinusoidal signal is applied between deflection plates 26 and 27, the beam is caused cyclically to sweep back and forth between anode 24 and anode 25. Consequently, since full beam current is switched from one anode to the other in a relatively small fraction of a cycle, oppositely phased square-wave output signals are produced in load circuits respectively associated with output anodes 24 and 25; in the preferred embodiment of the invention, only one square-wave output signal is required, and either anode 24 or anode 25 is employed to develop the output signal while the other is directly connected to accelerating electrode 23.

The two electrode systems are combined in a single tube structure and are arranged to cooperate with each other in a particular manner to be hereinafter described in detail. Specifically, the combined tube structure of Figure 1 is particularly well adapted to serve as a combined noise-immune synchronizing-signal separator, balanced automatic-frequency-control phase-detector, line-frequency oscillator, reactance tube, and gated automatic gain control generator in a television receiver or the like.

In Figure 1, only the essential elements of the electrode system are illustrated. Refinements of this system may be made in accordance with well-known practices in the art. Thus, for example, a plate having a slot narrower than the emissive surface of cathode 10 may be interposed between cathode 10 and either or both of the accelerating electrodes 12 and 23 and maintained at or near cathode potential to restrict electron emission to a narrow central portion of the respective emissive surfaces of cathode 10. Moreover, it may be advantageous to include one or more suppressor electrodes between intercepting anode 13 and plate electrodes 16, 17 and 19. The particular form of deflection-control means employed in the right-hand half of the structure of Figure 1 is not essential to the present invention; one or both of the deflection plates 20 and 21 may be replaced by several electrodes biased at different potentials which may correspond, for example, to cathode potential and the D. C. supply voltage of the associated apparatus with which the tube is employed. Moreover, either or both of the sheet-like electron beams may be split into two or more beams subjected to a common transverse deflection field, and such an arrangement is to be considered within the scope of the appended claims.

The electrode system is mounted within a suitable envelope (not shown) which may then be evacuated and gettered in accordance with well known procedures in the art. The entire structure may conveniently be included in a miniature tube envelope, a number of the electrode connections being made internally of the envelope in a manner to be described hereinafter for the purpose of minimizing the number of required external circuit connections.

Figures 3, 5:
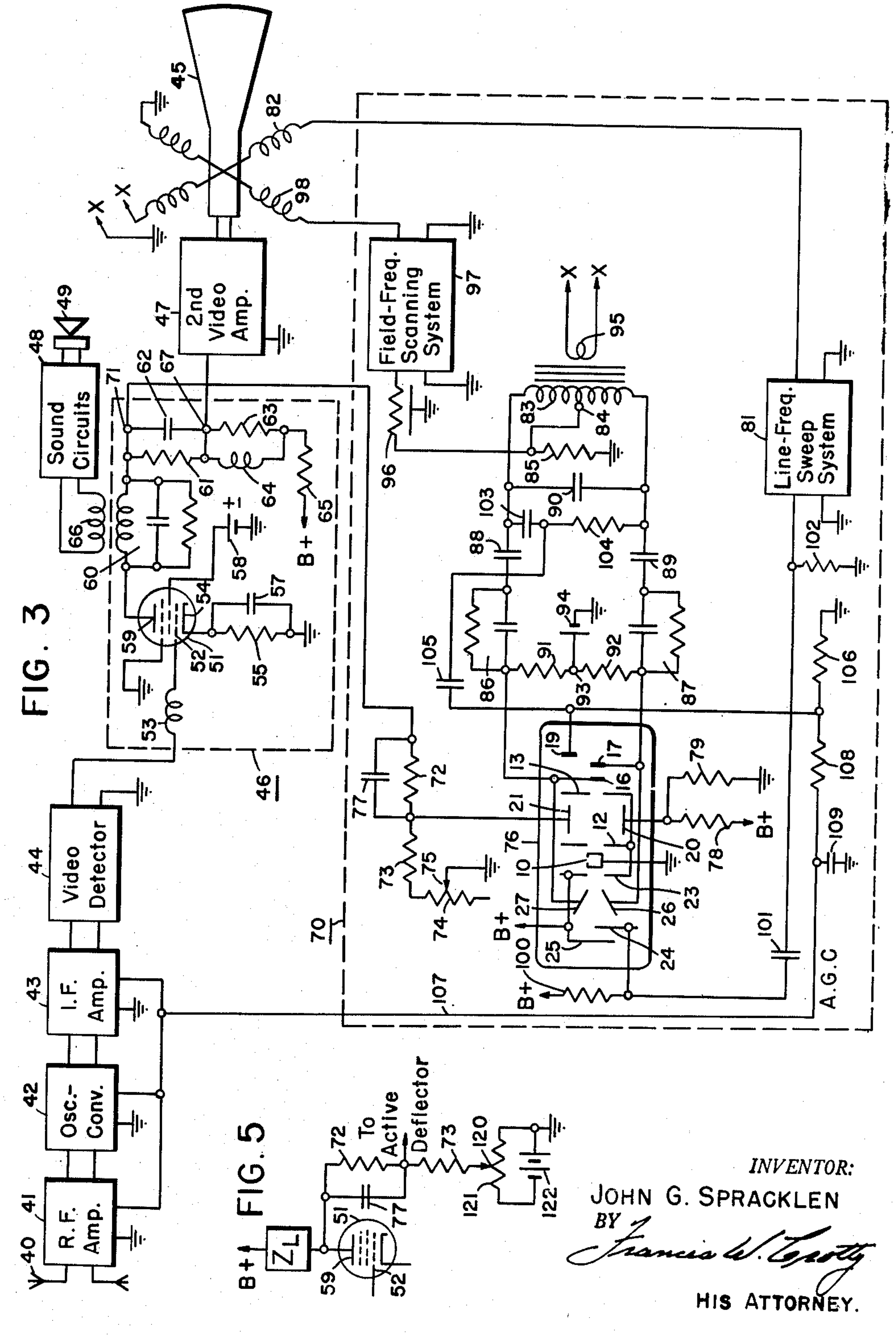
Figure 3 is a schematic diagram of a television receiver embodying the present invention.
Figure 5 is a schematic diagram of a modification of a portion of the receiver of Figure 3.

A beam deflection tube of the type shown and described in connection with Figures 1 and 2 may be employed in a television receiver in the manner schematically illustrated in Figure 3. Incoming composite televsion signals are intercepted by an antenna 40 and translated by receiving circuits, including a radio-frequency amplifier 41, an oscillator-converter 42 and an intermediate-frequency amplifier 43, to a video detector 44. Detected composite video signals from detector 44 are impressed on the input circuit of a cathode-ray tube 45 or other suitable image-reproducing device through first and second video amplifiers 46 and 47. Intercarrier sound signals from first video amplifier 46 are detected and amplified by conventional sound circuits 48 and impressed on a loudspeaker 49 or other suitable sound-reproducing device.

First video amplifier 46, which constitutes a signal-translating circuit, may comprise an electron-discharge device 51, preferably of the pentode type, having a control grid 52 which is direct-coupled to video detector 44 by means of a coil 53. The cathode 54 of device 51 is connected to ground through a bias resistor 55, and control gride 52 is returned to ground through the load circuit (not shown) of video detector 44. A small condenser 57 is connected in parallel with cathode resistor 55. The screen grid of device 51 is connected to the positive terminal of a suitable source of constant unidirectional operating potential, here shown as a battery 58, the negative terminal of which is grounded, while the suppressor grid of device 51 is directly connected to ground. The anode or output electrode 59 of device 51 is coupled to a suitable source of positive unidirectional operating potential, conventionally designated B+, through a load circuit comprising a damped parallel resonant circuit 60 tuned to the intercarrier beat frequency, the parallel combination of a resistor 61 and a condenser 62, the parallel combination of a resistor 63 and a peaking coil 64, and an additional resistor 65. Sound circuits 48 are inductively coupled to resonant circuit 60 by means of a coil 66, while second video amplifier 47 is coupled to the junction 67 between resistors 61 and 63.

Composite video signals from first video amplifier 46 are also supplied to a synchronizing system and automatic gain control generator, generally designated by the reference numeral 70, by means of a voltage-divider network connected to the junction 71 between resonant circuit 60 and resistor 61. The voltage-divider network comprises resistors 72 and 73 connected in series with a potentiometer 74 having a grounded movable tap 75, the junction between resistors 72 and 73 being connected to one deflection plate 21, hereinafter termed the active deflector, in the right-hand section of a beam deflection tube 76 of the type shown and described in connection with Figures 1 and 2. A condsenser 77 is connected in parallel with resistor 72. Cathode 10 of device 76 is connected to ground, and accelerating electrodes 12 and 23, target electrode 13, and second anode 25 of the left-hand section of device 76 are connected together (preferably internally of the envelope) and to a suitable source of unidirectional operating potential conventionally designated B+. Deflection plate 20 is connected to a tap on a voltage divider comprising resistors 78 and 79 connected between B+ and ground.

The synchronizing system also comprises a line-frequency sweep system 81, which may include a discharge tube and a power output stage, for impressing suitable deflection currents on the line-frequency deflection coil 82 associated with image-reproducing device 45. Plate electrodes 16 and 17 of device 76 are coupled to opposite terminals of a coil 83, having a center tap 84 which is returned to ground through a resistor 85, by means of respective anti-hunt networks comprising shunt-connected resistor-condenser combinations 86 and 87, and condensers 88 and 89. A condenser 90 is connected in parallel with coil 83, and a pair of resistors 91 and 92 are connected between plate electrodes 16 and 17, the junction 93 between resistors 91 and 92 preferably being connected to the positive terminal of a suitable source of unidirectional bias potential, here shown as a battery 94, the negative terminal of which is grounded. Coil 83 is inductively coupled to a coil 95 which is preferably connected in series between line-frequency deflection coil 82 and ground, as indicated by the terminal designations $x$—$x$. Center tap 84 of coil 83 is also coupled through an integrator 96 to a field-frequency scanning system 97 which provides suitable deflection currents to a field-frequency deflection coil 98 associated with image-reproducing device 45.

Plate electrodes 16 and 17 are directly connected to electrostatic-deflection plates 27 and 26 respectively in the left-hand section of device 76, and anode 24 is connected to B+ through a load resistor 100 and to line-frequency sweep system 81 through a differentiating network comprising a series condenser 101 and a shunt resistor 102.

A keying signal is supplied to plate electrode 19 from the junction between a condenser 103 and a resistor 104 connected in series across the terminals of coil 83, by means of a coupling condenser 105 and a shunt resistor 106. Plate electrode 19 is coupled to the automatic gain control (AGC) lead 107 by means of resistor 106 and an integrating network comprising a series resistor 108 and a shunt condenser 109, and AGC lead 107 is connected to one or more of the receiving circuits comprising radio-frequency amplifier 41, oscillator-converter 42 and intermediate-frequency amplifier 43.

In normal operation, positive-polarity composite video signals, including the direct-voltage components, from the output circuit of first video amplifier 46 are applied to active deflection plate 21 by means of the voltage-divider network comprising resistors 72, 73 and 74 and condenser 77. Deflection plates 20 and 21 are so biased that the beam projected through aperture 11 of accelerating electrode 12 is normally directed to an electron-impervious portion of intercepting anode 13, as for instance, to a solid portion of anode 13 on the side of apertures 14 and 15 nearer deflection plate 20. Application of the positive-polarity composite video signals to deflection plate 21 causes a transverse deflection of the beam in accordance with the instantaneous signal amplitude. The operating potentials for the various electrodes are so adjusted that different longitudinal portions of the beam are respectively deflected entirely into aperture 14 and partially into aperture 15 of intercepting anode 13 in response to the synchronizing-signal components of the applied composite video signals; the beam is entirely intercepted by anode 13 and/or deflection plate 20 during video-signal intervals. As a consequence, plate current is only permitted to flow to plate electrodes 16, 17 and 19 during synchronizing-pulse intervals.

The left-hand section of device 76 serves as a line-frequency oscillator in the line-frequency scanning system. Oppositely phased sinusoidal signals are applied to deflection plates 26 and 27 by means of coil 83 and condenser 90 which are tuned to the line-scanning frequency and which are excited by means of coil 95 inserted in series with the line-frequency deflection coil 82. Consequently, the beam in the left-hand section of device 76 is caused to sweep back and forth between anodes 24 and 25, so that a square-wave output voltage is developed across resistor 100. This square-wave output voltage is differentiated by means of condenser 101 and resistor 102, and the resulting positive-polarity or negative-polarity pulses are employed to trigger line-frequency sweep swstem 81, depending on the construction of that sweep system.

At the same time, the same oppositely phased sinusoidal voltage waves applied to deflection plates 27 and 26 are impressed on plate electrodes 16 and 17, respectively, in the right-hand section of device 76. As previously mentioned, current flow to plate electrodes 16 and 17 is restricted to synchronizing-pulse intervals by virtue of the geometry of target electrode 13. Current flow to plate electrodes 16 and 17 is further dependent upon the instantaneous potential of these electrodes during the synchronizing-pulse intervals. The oppositely phased sinusoidal signals developed by coil 83 and condenser 90 serve as comparison signals in a balanced automatic-frequency-control phase-detector. If the comparison signals are properly phased with respect to the incoming line-frequency synchronizing-signal pulses, the instantaneous potentials of plate electrodes 16 and 17 are equal at the time of the arrival of each synchronizing pulse, and no unidirectional control potential difference is developed between these plate electrodes. On the other hand, if the comparison signals and the incoming line-frequency synchronizing-signal pulses are not in phase synchronism, the instantaneous potentials of the two phase-detector plate electrodes 16 and 17 at the time of arrival of each line-frequency synchronizing-signal pulse are different, so that the beam currents collected by phase-detector plate electrodes 16 and 17 are unequal and a unidirectional control signal is developed between plate electrodes 16 and 17. Since these plate electrodes are directly connected to deflection plates 27 and 26 respectively in the left-hand section of device 76, the beam in the left-hand section is accelerated or retarded in its progress from anode 24 to anode 25 and back. As a result, the positive and negative half-cycles of the output voltage wave developed across resistor 100 are altered in time duration in accordance with the unidirectional control potential difference between electrodes 16 and 17. The quasi-square wave thus developed is differentiated to provide properly phased triggering pulses for line-frequency sweep system 81.

In order to obtain the desired automatic-frequency-control action, it is essential that a condition in which the comparison signals lag the incoming synchronizing-signal pulses result in an increase in the frequency of the local oscillator comprising the left-hand section of device 76, line-frequency sweep system 81, and feedback circuit 95, 83. This operation is insured by the common direct connections for both the sinusoidal comparison signals and the unidirectional AFC potential from plate electrodes 16 and 17 to deflection plates 27 and 26 respectively. It is possible, for a given construction of sweep system 81, that the system may fail to oscillate altogether due to incorrect phasing of the comparison signals and the triggering pulses for the line-frequency sweep system; this condition may be corrected by merely reversing the terminal connections of feedback coil 95 or of coil 83, or, if separate leads are provided for anodes 24 and 25, by reversing the circuit connections of these two anodes. Proper pull-in action is automatically insured for any condition for which oscillation is obtained.

To obtain field-frequency synchronization, the output currents to phase-detector plate electrodes 16 and 17 are effectively combined by means of a resistor 85 connected in the common ground return for plate electrodes 16 and 17. The combined output appearing across resistor 85 is integrated by means of integrator 96 to provide a control signal for field-frequency scanning system 97. It is of course also within the scope of the present invention to employ a separate plate electrode for the sole purpose of developing field-frequency synchronizing-signal pulses for application to the field-frequency scanning system, as described in the above-identified copending Spracklen application.

Plate electrode 19 develops a unidirectional control potential indicative of the amplitude of the composite video signals for application to the receiving circuits preceding the video detector to effect automatic gain control of the receiver. The sinusoidal line-frequency voltage developed across coil 83 and condenser 90 is impressed across the series combination of condenser 103 and resistor 104, and the phase-shifted sinusoidal voltage wave appearing across resistor 104 is applied to plate electrode 19 as a keying or energizing signal. Condenser 103 and resistor 104 are proportioned to provide a phase shift of the keying signal with respect to the voltage across coil 83 which is suitable to insure peak energization of plate electrode 19 during the line-synchronizing pulse intervals. This keying signal performs a gating function, permitting plate electrode 19 to accept space electrons passing through aperture 15 of intercepting anode 13 only during those intervals when plate electrode 19 is instantaneously positive. Consequently, a control potential is developed across resistor 106 in response to time coincidence of the synchronizing-signal components of the composite video signals and the positive-polarity keying signal applied to plate electrode 19. This control potential is integrated by resistor 108 and condenser 109 to provide a negative-polarity unidirection control potential for application to the AGC lead 107.

Certain important advantages of the system described in connection with Figure 3 may best be understood by consideration of that figure in connection with Figures 1 and 2. Since aperture 14 in intercepting anode 13 has definite fixed boundaries, it is apparent that deflection of the beam beyond aperture 14 results in interception thereof by anode 13. Consequently, ex- traneous noise pulses, which are generally of much larger amplitude than any desired component of the composite video signals, are not translated to plate electrodes 16 and 17. Thus, loss of synchronization due to extraneous impulse noise is substantially precluded. This operation is apparent from the operating characteristic 30 of Figure 2. When composite video signals comprising synchronizing-pulse components 32 and video-signal components 33 are impressed on active deflection palte 21, extraneous noise pulses 34 and 35, which are of greater amplitude than the synchronizing-pulse components by an amount exceeding the voltage represented by the spacing between vertical lines 36 and 37, result in deflection of the beam beyond aperture 14; consequently, these noise pulses are not translated to the output circuits associated with plate electrodes 16 and 17 and substantial noise immunity is achieved. Aperture 14 is preferably of constant length in a direction parallel to cathode 10, in order to provide output current pulses of constant amplitude for application to scanning system 97 and to permit balanced operation of phase-detector plates 16 and 17.

The operation of the gated automatic gain control system may perhaps best be understood by a consideration of operating characteristic 31 of Figure 2. Space electrons are permitted to pass to plate electrode 19 only when the electron beam is laterally deflected at least partially into aperture 15, and then only if plate electrode 19 is instantaneously maintained at a positive potential, as by the keying signal applied thereto from resistor 104. In an equilibrium condition, the deflection-control system is so biased that the peaks of the synchronizing-signal pulses are impressed on the rising portion of characteristic 31, as indicated by vertical line 36. When the signal amplitude increases, the peaks of the synchronizing pulses 32 instantaneously extend further to the right, and the space current to plate electrode 19 is increased. This results in an increase in the negative unidirectional control potential applied to the receiving circuits 41, 42 and 43, thus reducing the gain of these circuits and thereby restoring the amplitude of the input signal applied to active deflection plate 21 to the equilibrium value indicated in the drawing. On the other hand, if the signal amplitude instantaneously decreases, the negative gain-control potential decreases and the gain of the receiving circuits is increased to restore equilibrium. Noise pulses 34 and 35 occurring during the video signal intervals have substantially no effect on the automatic gain control potential since plate electrode 19 is maintained at or below cathode potential during these intervals by the keying signal applied from sweep system 61. Moreover, even such noise pulses as may occur during synchronizing-pulse intervals or at other times when plate electrode 19 is positive relative to cathode 10, if of sufficiently great amplitude, are prevented from contributing to the automatic gain control potential by virtue of the finite boundaries of aperture 15. Consequently, even greater noise immunity is obtained with the present gated automatic gain control system than with conventional gated automatic gain control arrangements employing grid-controlled tubes for AGC generation.

Since it is desirable for the synchronizing pulses developed at plate electrodes 16 and 17 to be of constant amplitude, it is preferred that the peaks of the synchronizing-pulse components 32 be impressed on characteristic 30 at a constant-current region of that characteristic; in other words, the synchronizing-pulse components of the applied composite video signals should cause deflection of the upper portion of the beam entirely into aperture 14. At the same time, because of the automatic gain control action, the peaks of the synchronizing-pulse components 32 are always superimposed on a sloping portion of characteristic 31; in other words, the synchronizing-pulse components of the applied composite video signals cause deflection of the lower portion of the beam only partially into aperture 15. By disposing apertures 14 and 15 in overlapping or staggered alignment in a direction parallel to cathode 10, as illustrated in Figure 1, it is insured that whenever the automatic gain control action establishes the equilibrium condition illustrated by the graphical representation of Figure 2, synchronizing pulses of constant amplitude are developed at plate electrodes 16 and 17; in other words, the clipping level of the synchronizing-signal separator is automatically adjusted to accommodate varying signal strengths at the receiver input.

The operation of the system as just described presupposes that the automatic gain control system is continuously effective to maintain the amplitude of the composite video signal input to first video amplifier 46 at a substantially constant level regardless of the strength of the composite television signals received by antenna 40. It is possible that this automatic gain control action may be momentarily interrupted, as for example during channel switching operations. If the signal to which the receiver is tuned immediately following a momentary interruption of the automatic gain control action, or when the receiver is first turned on, is above an arbitrary threshold level, the negative-polarity composite video signals developed by video detector 44 may be of sufficient magnitude to bias amplifier tube 51 beyond cutoff by virtue of the direct coupling between video detector 44 and first video amplifier 46. When this occurs, the voltage at the take-off point 71 for the input to active deflector 21 of synchronizing-control tube 76 approaches the potential of the B+ source. This may result in a static deflection of the beam in the right-hand section of device 76 beyond AGC aperture 15. Under such abnormal operating conditions, the automatic gain control system is therefore precluded from operating to reduce the amplitude of the signal input to first video amplifier 46, and receiver synchronism is disrupted. In the absence of special precautions, this paralysis condition is self-perpetuating, and normal operation cannot be restored as long as the input signal remains of sufficient strength to hold first video amplifier 46 beyond cutoff.

In accordance with the present invention, to avoid disruption of receiver operation under such abnormal paralysis conditions, a voltage-divider network comprising resistors 72, 73 and condenser 77 is connected between take-off point 71 of first video amplifier 46 and the active deflector 21 of synchronizing-control tube 76, and the direct voltage-to-alternating voltage transmission ratio of the voltage-divider network is adjusted, as by means of variable tap 75, to a condition such that even when first video amplifier tube 51 is driven beyond cutoff and the voltage of take-off point 71 approaches B+, the position of the beam in the right-hand section of device 76 at least partially intercepts the AGC aperture 15. At the same time, full A. C. coupling is provided to insure clean separation of the synchronizing-signal components from the video-signal components at phase-detector plate electrodes 16 and 17.

This operation may perhaps be more clearly understood from a consideration of the graphical representation of Figure 4, in which the voltage $e_a$ at take-off point 71 and the input voltage $e_i$ applied to active deflector 21 are plotted as functions of the grid voltage $e_g$ of first video amplifier tube 51. Under normal operating conditions, when the AGC system is effective, control grid 52 of first video amplifier tube 51 is biased to an operating point represented by dot-dash line 110 on the sloping part of the characteristics. Since full A. C. coupling is provided by condenser 77, the input voltage applied to active deflector 21 may be graphically determined by projecting the signal applied to the video amplifier grid on a line 111 through the $e_i$ characteristic at the operating point determined by normal operating bias 110 and parallel to the sloping portion of the $e_a$ characteristic. As long as the AGC system is not interrupted, this condition is maintained without substantial change, and the beam in the right-hand section of synchronizing-control tube 76 is deflected to a first position (overlapping the leading edge of AGC slot 15 as indicated by dotted line 36 of Figure 2), represented by dotted line 112, in response to the synchronizing-signal components.

Under abnormal operating conditions of the type described, during channel switching operations or at other times when the AGC system momentarily loses control and the signal output from the video detector becomes strong enough to paralyze the first video amplifier as represented by dot-dash line 113 in Figure 4, the beam in the right-hand section of synchronizing-control tube 76 is deflected to a second, static, position determined by the direct voltage transmission ratio of the voltage-divider network. To avoid paralysis of the AGC system and loss of synchronization under such abnormal operating conditions, the direct voltage-to-alternating voltage transmission ratio of the voltage-divider network is so adjusted that the second position of the beam, represented by line 114, also intercepts AGC aperture 15, as depicted in Figure 4. Consequently, an automatic gain control potential is developed even during such time as the first video amplifier may be paralyzed, and this control potential in turn reduces the signal amplitude at the input to the video detector until the first video amplifier tube again becomes operative and normal operating conditions are restored.

It is apparent from the graphical representation of Figure 4 that the range throughout which the direct voltage-to-alternating voltage transmission ratio of the voltage-divider network may be varied while still precluding receiver paralysis under abnormal operating conditions is determined by the width of AGC slot 15 in the direction of beam deflection. As previously pointed out, it is desirable to make the AGC slot as narrow as possible to obtain optimum noise immunity. Consequently, in practical embodiments of the system, it has been found that the desired operation is achieved with transmission ratios within a relatively limited range. In general, the desired operating condition is achieved when the direct voltage-to-alternating voltage transmission ratio is of the order of one-half, although it is apparent that the desired ratio is dependent at least in part on tube geometry and the power supply voltage.

In some applications, it may be desirable to return resistor 73 of the voltage-divider network to a negative unidirectional operating potential source rather than to ground. Such an arrangement is illustrated schematically in Figure 5, wherein resistor 73 is connected to a variable tap 120 on a potentiometer 121 connected in parallel with a suitable source of unidirectional operating potential, illustrated as a battery 122, grounded at its positive terminal. In other applications, it may be desirable to return the voltage-divider network to a positive operating potential source.

While the desired operating characteristics are obtained in the right-hand section of the beam deflection tube of Figure 1 by employing an apertured target or intercepting anode backed by a plurality of plate electrodes, it is apparent that equivalent operation may be achieved by providing plate electrodes of a size, shape and space distribution corresponding to the areas of plate electrodes 16, 17 and 19 exposed to the electron beam, followed by anode means for collecting space electrons not collected by such plate electrodes. In some of the appended claims, therefore, the output system is described as comprising one or more plate electrodes having specifically defined receptive areas, and this terminology is to be construed as descriptive of a tube employing either the apertured target construction shown in Figure 1 or the alternative construction described above. However, the apertured target construction is preferred for its simplicity and ease of manufacture.

Certain features of the disclosed tube and system are specifically disclosed and claimed in one or more of the following copending applications:

| Applicant | Serial No. | Filing Date | Title |
|---|---|---|---|
| Robert Adler | 242, 509 | August 18, 1951 | Television Receiver. |
| John G. Spracklen | 246, 768 | September 15, 1951 | Do. |
| Robert Adler | 260, 221 | December 6, 1951 | Synchronizing Control Apparatus. |
| Do | 267, 826 | January 23, 1952 | Frequency Controllable Oscillating Systems. |
| Do | 314, 373 | October 11, 1952 | Television Receiver. |
| John G. Spracklen | 323, 752 | December 3, 1952 | Do. |

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. In a television receiver: an image-reproducing device; a scanning system for controlling the scansion of said image-reproducing device; receiving circuits for translating received composite television signals; a video detector for demodulating said translated composite television signals to produce unidirectional composite video signals including video-signal components and synchronizing-signal components of amplitude greater than the maximum amplitude of said video-signal components; means for utilizing said synchronizing-signal components to control said scanning system; a signal-translating circuit direct-coupled to said video detector for translating said composite video signals under normal operating conditions but subject to paralysis under abnormal operating conditions; a beam deflection tube comprising an electron gun for projecting an electron beam, an electrostatic deflection-control system responsive to an input signal for subjecting said beam to a transverse deflection field, a plate electrode having a predetermined receptive area narrow relative to the full deflection range of said control system, and an anode for collecting electrons not collected by said plate electrode; a voltage-divider network connected between said signal-translating circuit and said deflection-control system and having a direct voltage-to-alternating voltage transmission ratio less than unity for causing transverse deflection of said beam to a first position intercepting said receptive area in response to said synchronizing-signal components under said normal conditions and to a second position, also intercepting said receptive area, under said abnormal conditions; means for energizing said plate electrode; an output circuit coupled to said plate electrode for developing a unidirectional control potential in response to collection of space electrons by said receptive area; and means for utilizing said control potential to effect automatic control of an operating characteristic of said receiver.

2. In a television receiver: an image-reproducing device; a scanning system for controlling the scansion of said image-reproducing device; receiving circuits for translating received composite television signals; a video detector for demodulating said translated composite television signals to produce unidirectional composite video signals including video-signal components and synchronizing-signal components of amplitude greater than the maximum amplitude of said video-signal components; means for utilizing said synchronizing-signal components to control said scanning system; a signal-translating circuit including a grid-controlled electron-discharge device direct-coupled to said video detector for translating said composite video signals under normal operating conditions but subject to paralysis under abnormal operating conditions; a beam deflection tube comprising an electron gun for projecting an electron beam, an electrostatic deflection-control system responsive to an input signal for subjecting said beam to a transverse deflection field, a plate electrode having a predetermined receptive area narrow relative to the full deflection range of said control system, and an anode for collecting electrons not collected by said plate electrode; a voltage-divider network connected between said signal-translating circuit and said deflection-control system and having a direct voltage-to-alternating voltage transmission ratio less than unity for causing transverse deflection of said beam to a first position intercepting said receptive area in response to said synchronizing-signal components under said normal conditions and to a second position, also intercepting said receptive area, under said abnormal conditions; means for energizing said plate electrode; an output circuit coupled to said plate electrode for developing a unidirectional control potential normally indicative of the amplitude of said composite video signals; and means for applying said control potential to said receiving circuits to effect automatic gain control of said receiver.

3. In a television receiver: an image-reproducing device; a scanning system for controlling the scansion of said image-reproducing device; receiving circuits for translating received composite television signals; a video detector for demodulating said translated composite television signals to produce unidirectional composite video signals including video-signal components and synchronizing-signal components of amplitude greater than the maximum amplitude of said video-signal components; means for utilizing said synchronizing-signal components to control said scanning system; a signal-translating circuit direct-coupled to said video detector for translating said composite video signals under normal operating conditions but subject to paralysis under abnormal operating conditions; a beam deflection tube comprising an electron gun for projecting an electron beam, an electrostatic deflection-control system responsive to an input signal for subjecting said beam to a transverse deflection field, a plate electrode having a predetermined receptive area narrow relative to the full deflection range of said control system, and an anode for collecting electrons not collected by said plate electrode; a voltage-divider network connected between said signal-translating circuit and said deflection-control system and having a direct voltage-to-alternating voltage transmission ratio less than unity for causing transverse deflection of said beam to a first position intercepting said receptive area in response to said synchronizing-signal components under said normal conditions and to a second position, also intercepting said receptive area, under said abnormal conditions; means coupled to said scanning system for applying to said plate electrode a keying signal bearing a fixed phase relation to said scansion; an output circuit coupled to said plate electrode and responsive to time coincidence of said keying signal and said synchronizing-signal components for developing a unidirectional control potential normally indicative of the amplitude of said composite video signals; and means for applying said control potential to said receiving circuits to effect automatic gain control of said receiver.

4. In a television receiver: an image-reproducing device; a scanning system for controlling the scansion of said image-reproducing device; receiving circuits for translating received composite television signals; a video detector for demodulating said translated composite television signals to produce unidirectional composite video signals including video-signal components and synchronizing-signal components of amplitude greater than the maximum amplitude of said video-signal components; means for utilizing said synchronizing-signal components to control said scanning system; a signal-translating circuit direct-coupled to said video detector for translating said composite video signals under normal operating conditions but subject to paralysis under abnormal operating conditions; a beam deflection tube comprising an electron gun including an elongated cathode for projecting a sheet-like electron beam of substantially rectangular cross-section, an electrostatic deflection-control system responsive to an input signal for subjecting said beam to a transverse deflection field, an anode having an aperture of predetermined width narrow relative to the full deflection range of said control system, and a plate electrode for collecting space electrons passing through said aperture; a voltage-divider network connected between said signal-translating circuit and said deflection-control system and having a direct voltage-to-alternating voltage transmission ratio less than unity for causing transverse deflection of said beam to a first position intercepting said aperture in response to said synchronizing-signal components under said normal conditions and to a second position, also intercepting said aperture, under said abnormal conditions; means for energizing said plate electrode; an output circuit coupled to said plate electrode for developing a unidirectional control potential normally indicative of the amplitude of said composite video signals; and means for applying said control potential to said receiving circuits to effect automatic gain control of said receiver.

5. In a television receiver: an image-reproducing device; a scanning system for controlling the scansion of said image-reproducing device; receiving circuits for translating received composite television signals; a video detector for demodulating said translated composite television signal to produce unidirectional composite video signals including video-signal components and synchronizing-signal components of amplitude greater than the maximum amplitude of said video-signal components; a signal-translating circuit direct-coupled to said video detector for translating said composite video signals under normal operating conditions but subject to paralysis under abnormal operating conditions; a beam deflection tube comprising an electron gun including an elongated cathode for projecting a sheet-like electron beam of substantially rectangular cross-section, an electrostatic deflection-control system responsive to an input signal for subjecting said beam to a transverse deflection field, at least two plate electrodes having predetermined respective receptive areas each narrow relative to the full deflection range of said control system and disposed in overlapping alignment in a direction parallel to said cathode, and anode means for collecting electrons not collected by said plate electrodes; a voltage-divider network connected between said signal translating circuit and said deflection-control system and having a direct voltage-to-alternating voltage transmission ratio less than unity for causing transverse deflection of said beam to a first position intercepting both of said receptive areas in response to said synchronizing-signal components under said normal conditions and to a second position, intercepting the receptive area of at least one of said plate electrodes, under said abnormal conditions; means for energizing said one plate electrode; an output circuit coupled to said one plate electrode for developing a unidirectional control potential normally indicative of the amplitude of said composite video signals; means for applying said control potential to said receiving circuits to effect automatic gain control of said receiver; and an additional output circuit coupled to the other of said plate electrodes for controlling said scanning system.

6. In a television receiver: an image-reproducing device; a scanning system for controlling the scansion of said image-reproducing device; receiving circuits for translating received composite television signals; a video detector for demodulating said translated composite television signal to produce unidirectional composite video signals including video-signal components and synchronizing-signal components of amplitude greater than the maximum amplitude of said video-signal components; a signal-translating circuit direct-coupled to said video detector for translating said composite video signals under normal operating conditions but subject to paralysis under abnormal operating conditions; a beam deflection tube comprising an electron gun including an elongated cathode for projecting a sheet-like electron beam of substantially rectangular cross-section, an electrostatic deflection-control system responsive to an input signal for subjecting said beam to a transverse deflection field, at least two plate electrodes having predetermined respective receptive areas each narrow relative to the full deflection range of said control system and disposed in overlapping alignment in a direction parallel to said cathode, and anode means for collecting electrons not collected by said plate electrode; a voltage-divider network connected between said signal-translating circuit and said deflection-control system and having a direct voltage-to-alternating voltage transmission ratio less than unity for causing transverse deflection of said beam to a first position intercepting both of said receptive areas in response to said synchronizing-signal components under a normal condition and to said second position, intercepting the receptive area of at least one of said plate electrodes, under said abnormal conditions; means for energizing said one said plate electrode; an output circuit coupled to said one plate electrode for developing a first unidirectional control signal normally indicative of the instantaneous amplitude of said composite video signals; means for applying said first control signal to said receiving circuits to effect automatic gain control of said receiver; means coupled to said scanning system for applying to the other of said plate electrodes a comparison signal bearing a fixed phase relation to said scansion; an output circuit coupled to said other plate electrode for developing a second unidirectional control signal indicative of the instantaneous phase relation between said synchronizing-signal components and said comparison signal; and means for utilizing said second control signal to effect phase synchronism of said scanning system with said synchronizing-signal components.

7. In a television receiver: an image-reproducing device; a scanning system for controlling the scansion of said image-reproducing device; receiving circuits for translating received composite television signals; a video detector for demodulating said translated composite television signals to produce unidirectional composite video signals including video-signal components and synchronizing-signal components of amplitude greater than the maximum amplitude of said video-signal components; means for utilizing said synchronizing-signal components to control said scanning system; a signal-translating circuit direct-coupled to said video detector for translating said composite video signals under normal operating conditions but subject to paralysis under abnormal operating conditions; a beam deflection tube comprising an electron gun for projecting an electron beam and an electrostatic deflection-control system responsive to an input signal for subjecting said beam to a transverse deflection field; a voltage-divider network connected between said signal-translating circuit and said deflection-control system and having a direct voltage-to-alternating voltage transmission ratio less than unity for causing transverse deflection of said beam to a first position in response to said synchronizing-signal components under said normal conditions and to a second position under said abnormal conditions; a plate electrode, included in said beam deflection tube, comprising a receptive area having a maximum effective dimension in the direction of beam deflection only slightly greater than the lateral distance between said beam positions, said receptive area overlapping both of said beam positions; an anode included in said beam deflection tube for collecting space electrons not collected by said plate electrode; means for energizing said plate electrode; an output circuit coupled to said plate electrode for developing a unidirectional control potential in response to collection of space electrons by said receptive area; and means for utilizing said control potential to effect automatic control of an operating characteristic of said receiver.

References Cited in the file of this patent

UNITED STATES PATENTS

| Number | Name | Date |
|---|---|---|
| 2,159,818 | Plaistowe et al. | May 23, 1939 |
| 2,211,860 | Plaistowe | Aug. 20, 1940 |
| 2,369,749 | Nagy et al. | Feb. 20, 1945 |
| 2,606,300 | Adler | Aug. 5, 1952 |